US011267659B2

(12) United States Patent
Motowaki

(10) Patent No.: US 11,267,659 B2
(45) Date of Patent: Mar. 8, 2022

(54) APPARATUS FOR TAKING OUT WORKPIECE

(71) Applicant: FANUC CORPORATION, Yamanashi (JP)

(72) Inventor: Yoshio Motowaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 17/070,260

(22) Filed: Oct. 14, 2020

(65) Prior Publication Data

US 2021/0155417 A1    May 27, 2021

(30) Foreign Application Priority Data

Nov. 21, 2019  (JP) .............................. JP2019-210283

(51) Int. Cl.
*B65G 47/91* (2006.01)
(52) U.S. Cl.
CPC ................................... *B65G 47/91* (2013.01)
(58) Field of Classification Search
None
See application file for complete search history.

(56) References Cited

U.S. PATENT DOCUMENTS

| | | | | | |
|---|---|---|---|---|---|
| 4,794,689 | A | * | 1/1989 | Seno | H05K 13/082 29/740 |
| 5,544,411 | A | * | 8/1996 | Kano | H05K 13/0409 29/740 |
| 5,784,778 | A | * | 7/1998 | Yoshida | H05K 13/0413 29/834 |
| 5,960,534 | A | * | 10/1999 | Yazawa | H05K 13/041 29/743 |
| 6,101,707 | A | * | 8/2000 | Kano | H05K 13/041 29/740 |
| 6,154,954 | A | * | 12/2000 | Seto | H05K 13/041 29/740 |
| 6,161,277 | A | * | 12/2000 | Asai | H05K 13/041 29/740 |
| 6,260,898 | B1 | * | 7/2001 | Kano | B25J 9/109 294/188 |

(Continued)

FOREIGN PATENT DOCUMENTS

| | | | | |
|---|---|---|---|---|
| CN | 1207017 | * | 2/1999 | ............. H05K 13/02 |
| JP | H11-114864 A | | 4/1999 | |
| JP | 2006-261325 A | | 9/2006 | |

*Primary Examiner* — Ronald P Jarrett
(74) *Attorney, Agent, or Firm* — Shackelford, Bowen, McKinley & Norton, LLP

(57) ABSTRACT

An apparatus for taking out a workpiece includes: a nozzle head that has a plurality of suction nozzles, each of which has a suction unit configured to suction a workpiece, a frame that is attached to a transport apparatus, and a support unit that supports the plurality of suction nozzles and is supported by the frame in a movable manner, wherein the support unit is caused to move relative to the frame, thereby selectively arranging one of the plurality of suction nozzles at a predetermined use position; and a drive unit that causes one suction nozzle arranged at the predetermined use position to move relative to the frame and causes the one suction nozzle to move to a predetermined suction position at which the workpiece is suctioned by the suction unit.

5 Claims, 6 Drawing Sheets

(56) References Cited

U.S. PATENT DOCUMENTS

| | | | | |
|---|---|---|---|---|
| 6,678,944 B1* | 1/2004 | Kawada | ............. | H05K 13/0452 |
| | | | | 29/740 |
| 6,688,833 B1* | 2/2004 | Kabeshita | .......... | H05K 13/0413 |
| | | | | 414/416.01 |
| 7,401,401 B2* | 7/2008 | Usui | .................... | H05K 13/041 |
| | | | | 29/743 |
| 7,488,283 B2* | 2/2009 | Yasui | ................. | H05K 13/0409 |
| | | | | 483/1 |
| 9,452,897 B2* | 9/2016 | Nishiyama | ............... | B25J 15/04 |
| 9,821,474 B2* | 11/2017 | Reinhold | ............. | B65H 3/0883 |
| 10,285,314 B2* | 5/2019 | Nishiyama | ......... | H05K 13/0413 |
| 10,531,601 B2* | 1/2020 | Ito | ........................ | H05K 13/041 |
| 10,617,050 B2* | 4/2020 | Kawaguchi | ........ | H05K 13/0409 |
| 10,667,449 B2* | 5/2020 | Sugita | ................ | H05K 13/0409 |
| 10,813,260 B2* | 10/2020 | Kamio | .............. | H05K 13/0404 |
| 2006/0207090 A1* | 9/2006 | Kawada | .............. | H05K 13/041 |
| | | | | 29/832 |
| 2017/0105323 A1* | 4/2017 | Fukami | ............. | H05K 13/0409 |
| 2018/0213690 A1* | 7/2018 | Tanaka | .................. | B65H 27/00 |

* cited by examiner

APPARATUS FOR TAKING OUT WORKPIECE

CROSS-REFERENCE TO RELATED APPLICATIONS

This application claims the benefit of Japanese Patent Application No. 2019-210283, the content of which is incorporated herein by reference.

TECHNICAL FIELD

The present invention relates to an apparatus for taking out a workpiece.

BACKGROUND ART

In the related art, apparatuses adapted to suction and hold components using a magnetic force or a negative pressure are known (see Patent Literatures 1 and 2, for example). The apparatus in Patent Literature 1 has a plurality of types of suction nozzles, and a suction nozzle to be used to hold a component can be selected in accordance with the shape, the dimension, and the like of the component.

CITATION LIST

Patent Literature

{PTL 1}
Japanese Unexamined Patent Application, Publication No. 2006-261325
{PTL 2}
Japanese Unexamined Patent Application, Publication No. Hei 11-114864

SUMMARY OF INVENTION

According to an aspect of the present disclosure, there is provided an apparatus for taking out a workpiece including: a nozzle head that has a plurality of suction nozzles, each of which has a suction unit configured to suction a workpiece, a frame that is attached to a transport apparatus, and a support unit that supports the plurality of suction nozzles and is supported by the frame in a movable manner, wherein the support unit is caused to move relative to the frame, thereby selectively arranging one of the plurality of suction nozzles at a predetermined use position; and a drive unit that causes one suction nozzle arranged at the predetermined use position to move relative to the frame and causes the one suction nozzle to move to a predetermined suction position at which the workpiece is suctioned by the suction unit.

DESCRIPTION OF EMBODIMENTS

Hereinafter, an apparatus for taking out a workpiece 1 according to an embodiment will be described with reference to drawings.

The apparatus for taking out a workpiece 1 is adapted to take out one workpiece from a plurality of workpieces arranged at a predetermined taking-out position and transport the workpiece taken out to a predetermined transport position. The apparatus for taking out a workpiece 1 is attached to a transport apparatus and is caused to move between the taking-out position and the transport position by the transport apparatus.

In the embodiment, the transport apparatus is an industrial robot having a robot arm, and the apparatus for taking out a workpiece 1 is a suction-type hand apparatus connected to a distal end of the robot arm. The industrial robot is, for example, a vertically articulated robot, a horizontally articulated robot, or a parallel link robot. The transport apparatus may be any industrial machine other than the industrial robot.

Figure 1:
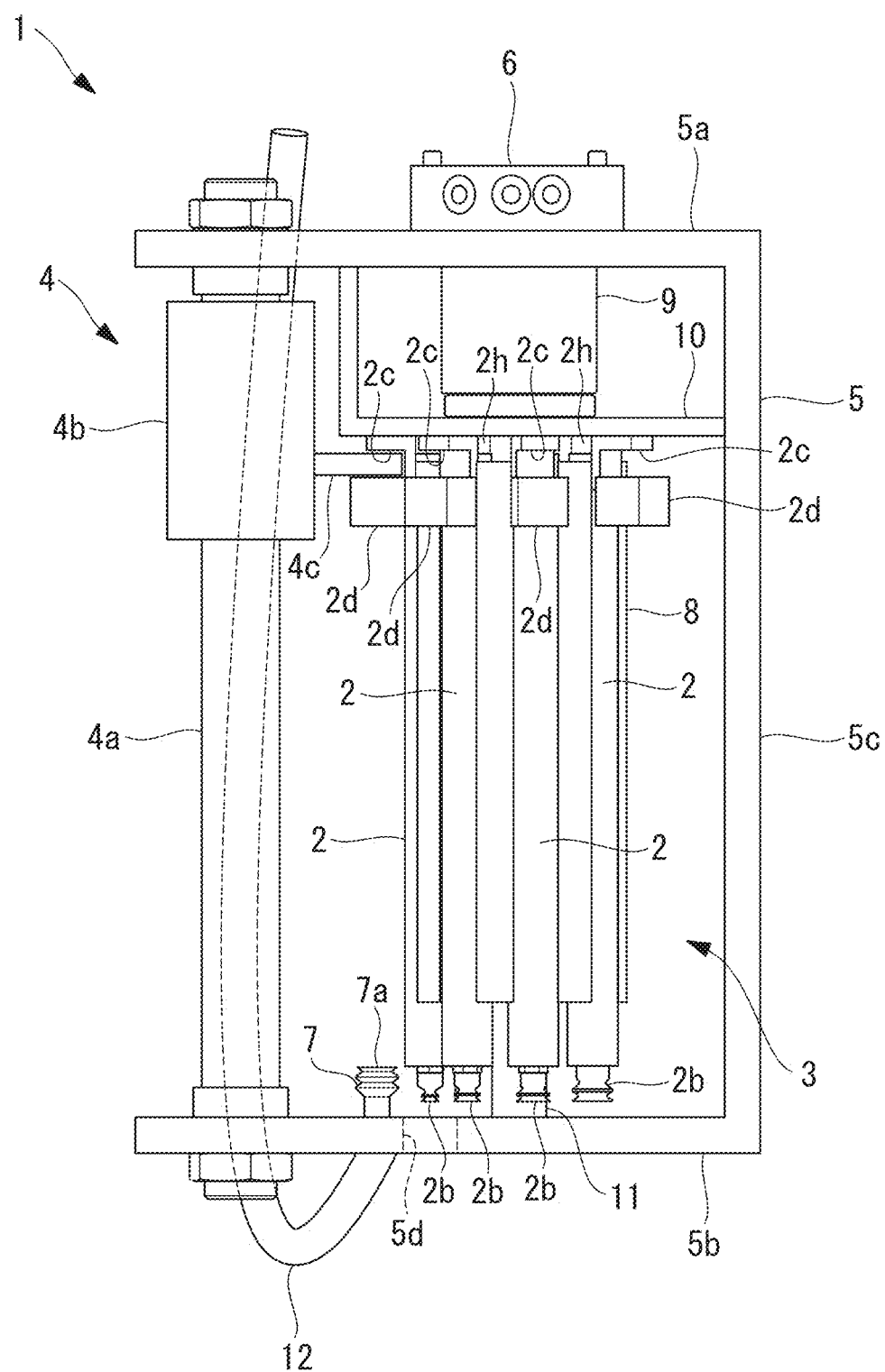
FIG. 1 is a side view illustrating an overall configuration of an apparatus for taking out a workpiece, which is a diagram illustrating a state in which all suction nozzles are arranged at a standby position, according to an embodiment.
Figure 2:
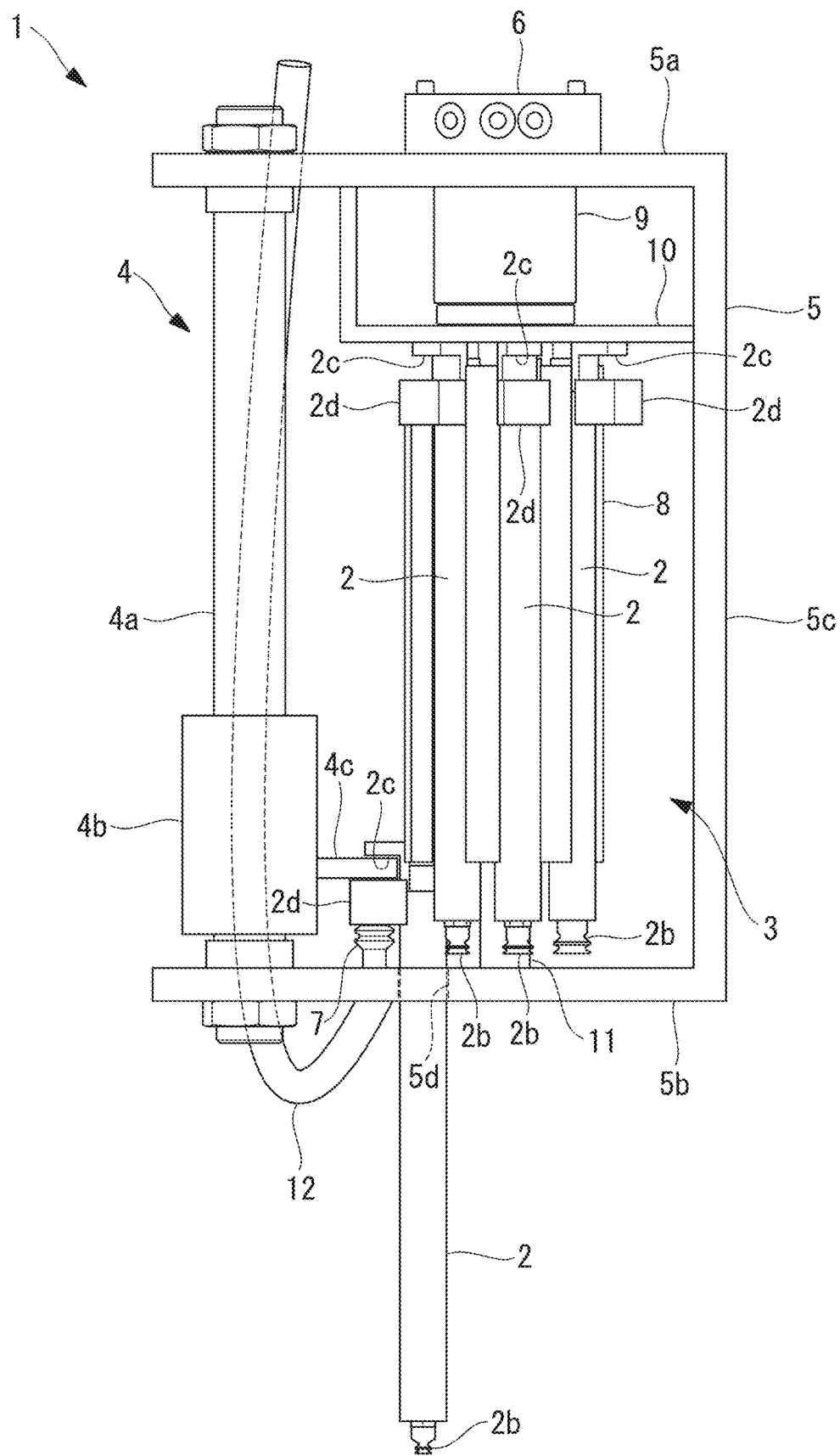
FIG. 2 is a side view illustrating an overall configuration of the apparatus for taking out a workpiece, which is a diagram illustrating a state in which a suction nozzle at a use position is arranged at a suction position, according to the embodiment.

The apparatus for taking out a workpiece 1 includes a nozzle head 3 that has a plurality of suction nozzles 2, a drive unit 4 that causes one of the suction nozzle 2 at a predetermined use position to move, a frame 5 that supports the nozzle head 3 and the drive unit 4, an automatic tool changer (ATC) 6 for attaching the frame 5 to a distal end of a robot arm, and an air connection unit 7 for supplying a negative pressure to the suction nozzle 2 at the use position, as illustrated in FIGS. 1 and 2.

The apparatus for taking out a workpiece 1 is connected to a robot control apparatus adapted to control operations of the robot arm, and operations of the nozzle head 3 and the drive unit 4, which will be described later, are controlled by the robot control apparatus in synchronization with operations of the robot arm.

As illustrated in FIGS. 1 and 2, the one suction nozzle 2 at the use position moves in the vertical direction. FIG. 1 illustrates a state in which all the suction nozzles 2 are arranged at a predetermined standby position, and FIG. 2 illustrates a state in which one suction nozzle at the use position is arranged at a predetermined suction position located further downward than the predetermined standby position. The standby position is a predetermined position in the vertical direction, at which the suction nozzles 2 are located between an upper plate 5a and a lower plate 5b of the frame 5. The suction position is a position at which the suction nozzles 2 project further downward than the frame 5.

The frame 5 has a C shape or a U shape in a side view seen in the horizontal direction and has the upper plate 5a and the lower plate 5b arranged at an interval from each other in the vertical direction and a side plate 5c connecting the upper plate 5a and the lower plate 5b. The nozzle head 3 and the drive unit 4 are arranged between the upper plate 5a and the lower plate 5b, and the ATC 6 is secured to an upper surface of the upper plate 5a.

The nozzle head 3 includes a revolver (support unit) 8 that supports each of the plurality of suction nozzles 2 in the vertical direction, a rotation drive unit 9 that causes the revolver 8 to rotate about a rotational axis line A in the vertical direction, and a magnetic member 10 for hanging the plurality of suction nozzles 2 supported by the revolver 8 using a magnetic force.

Figure 3:
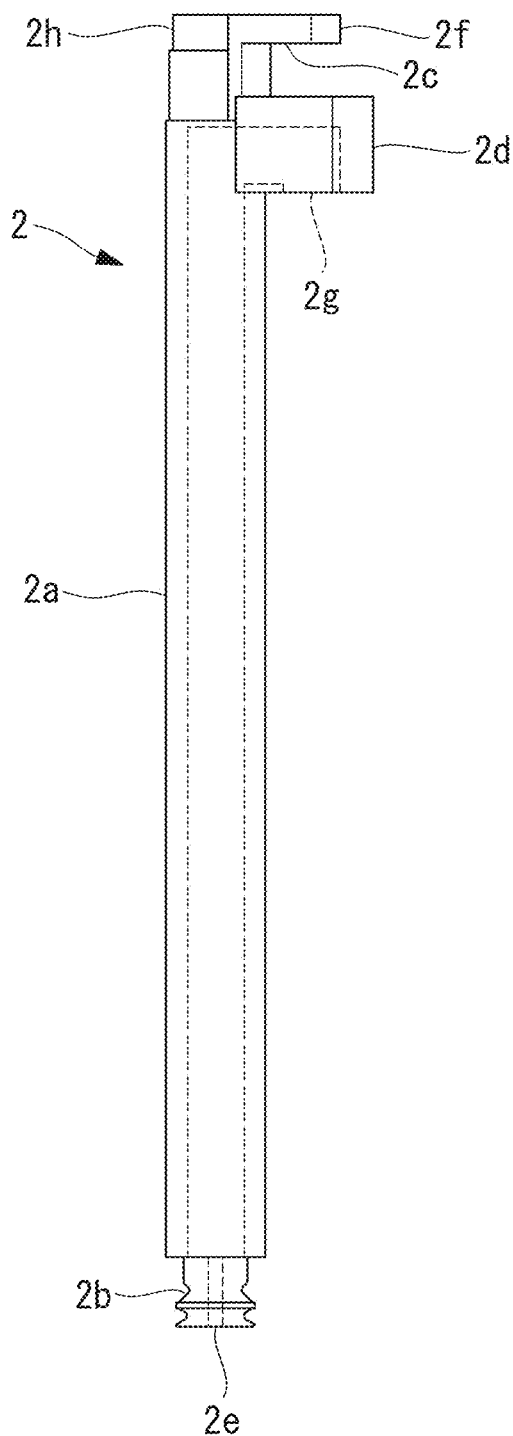
FIG. 3 is a side view of a suction nozzle.

As illustrated in FIG. 3, each suction nozzle 2 has a pipe 2*a* with a circular pipe shape, a suction unit 2*b* connected to a lower end of the pipe 2*a*, and an engagement unit (first engagement unit) 2*c* and an air connection unit 2*d* provided at an upper end portion of the pipe 2*a*.

The pipe 2*a* may be formed of a non-magnetic body such as aluminum or a resin in order to prevent the workpiece from being magnetized.

An inlet port 2*e* is opened in a lower end surface of the suction unit 2*b*, and the workpiece is suctioned to the suction unit 2*b* by a negative pressure supplied to the inlet port 2*e*. The dimensions and the shapes of the suction units 2*b* of the plurality of suction nozzles 2 are different from each other. In FIGS. 1 and 2, for example, the plurality of suction units 2*b* are different from each other in the outer diameters of the suction units 2*b* and the aperture diameters of the inlet port 2*e*. As will be described later, a suction unit 2*b* to be used is selected in accordance with a type of the workpiece that is a target of the suction. In a case in which the workpiece is a screw with a small diameter, for example, a suction unit 2*b* with a small inlet port 2*e* is selected. In a case in which the workpiece is a screw with a large diameter, a suction unit 2*b* with a large inlet port 2*e* is selected.

The engagement unit 2*c* and the air connection unit 2*d* are provided radially outside the pipe 2*a*, and both the engagement unit 2*c* and the air connection unit 2*d* are provided on the same side relative to the pipe 2*a*.

The engagement unit 2*c* is a recessed portion that is recessed in a direction that is perpendicularly intersects a longitudinal axis line of the pipe 2*a* toward the longitudinal axis line and is disposed further upward than the air connection unit 2*d*. For example, the engagement unit 2*c* is formed between the air connection unit 2*d* and a plate-shaped member 2*f* provided above the air connection unit 2*d*.

A connection port 2*g* is opened in a lower surface of the air connection unit 2*d*, and the connection port 2*g* communicates with the inlet port 2*e* via the inside of the air connection unit 2*d*, the pipe 2*a*, and the suction unit 2*b*.

A magnet 2*h* that is suctioned to the magnetic member 10 is provided at a proximal end of the suction nozzle 2.

Figure 4:
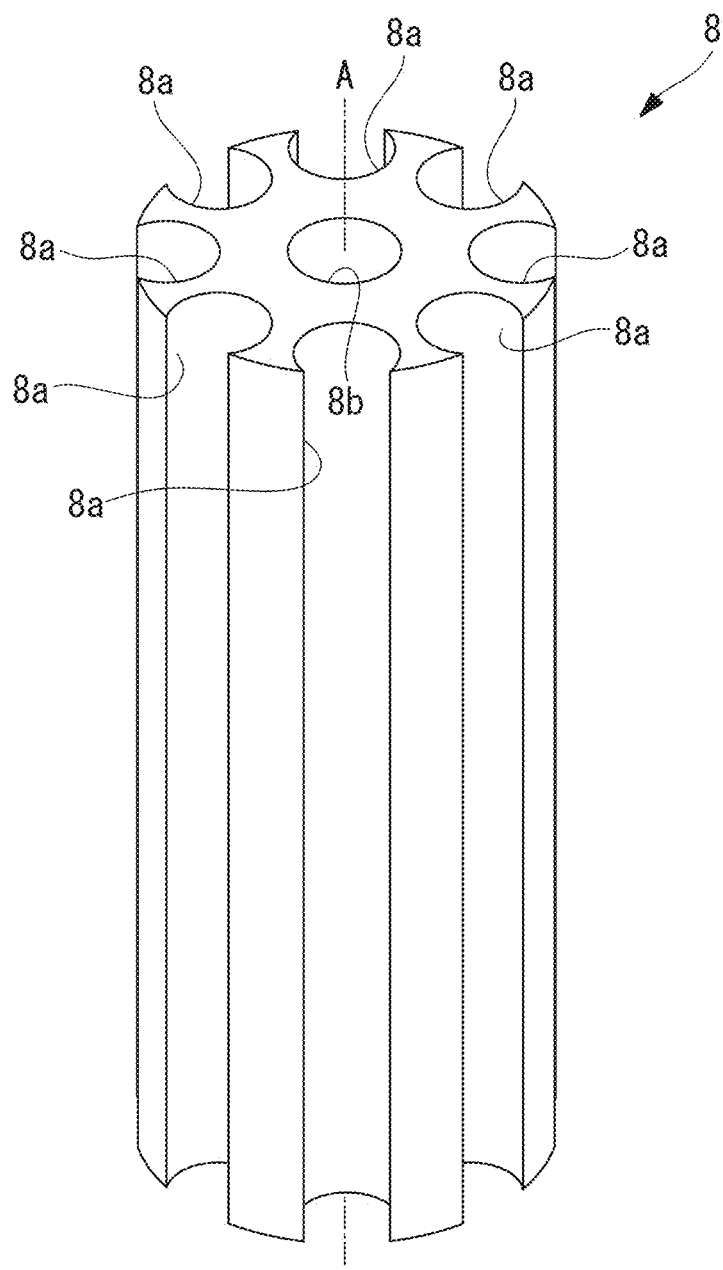
FIG. 4 is a perspective view of a revolver.

As illustrated in FIG. 4, the revolver 8 is a columnar member arranged in the vertical direction and is supported by the frame 5 via a shaft 11 so as to be rotatable about the rotational axis line A. The rotational axis line A conforms to a central axis line of the revolver 8. Specifically, the shaft 11 penetrates through the revolver 8 along the rotational axis line A, a lower end portion of the shaft 11 is supported by the lower plate 5*b* of the frame 5 so as to be rotatable about the rotational axis line A, and an upper end portion of the shaft 11 is connected to the rotation drive unit 9 secured to the frame 5. The reference sign 8*b* represents a center hole through which the shaft 11 penetrates.

Also, the revolver 8 has a plurality of grooves 8*a*, each of which penetrates the revolver 8 in a direction that is parallel to the rotational axis line A and accommodates each of the pipes 2*a* of the plurality of suction nozzles 2. In the drawing referred to, the revolver 8 has eight grooves 8*a* and supports eight suction nozzles 2. The plurality of suction nozzles 2 are supported in parallel to each other by the plurality of grooves 8*a* aligned in the circumferential direction around the rotational axis line A.

The plurality of grooves 8*a* are provided at an outer circumferential portion of the revolver 8 and are opened in the outer circumferential surface of the revolver 8, and the engagement units 2*c* and the air connection unit 2*d* are arranged outside the grooves 8*a*. In this manner, the suction nozzles 2 are supported by the grooves 8*a* so as to be movable in the vertical direction. Also, the engagement units 2*c* and the air connection unit 2*d* are arranged so as to project further outward in the horizontal direction than the pipes 2*a* and the revolver 8.

The rotation drive unit 9 is, for example, a rotary actuator. The rotation drive unit 9 causes the shaft 11 to rotate about the rotational axis line A and thereby causes the revolver 8 to rotate about the rotational axis line A relative to the frame 5. The plurality of grooves 8*a* and the plurality of suction nozzles 2 supported by the plurality of grooves 8*a* move to rotate about the rotational axis line A in response to the rotation of the revolver 8, and one of the plurality of suction nozzles 2 is thus selectively arranged at the predetermined use position. In other words, the predetermined use position is one location on the circumference around the rotational axis line A. In FIGS. 1 and 2, the position of the suction nozzle 2 at the left end is the predetermined use position.

The magnetic member 10 is a plate-shaped member horizontally arranged above the revolver 8 and secured to the frame 5 and is formed of magnetic metal such as iron. The magnetic member 10 is arranged at a position at which the magnets 2*h* of the plurality of suction nozzles 2 at the predetermined standby position are suctioned to the magnetic member 10. The suction nozzles 2 in the grooves 8*a* are hung and held in the standby position against their own weights, due to a magnetic attraction force between the magnets 2*h* and the magnetic member 10. The magnetic member 10 is arranged over the entire circumference around the rotational axis line A such that the suction of each magnet 2*h* to the magnetic member 10 is maintained during the rotation of the revolver 8.

The drive unit 4 causes the one suction nozzle 2 arranged at the predetermined use position to move in the vertical direction relative to the frame 5 and lifts and lowers the one suction nozzle 2 between the standby position and the suction position.

Specifically, the drive unit 4 has an air cylinder (linear motion mechanism) that has a rod 4*a* extending in the vertical direction and a cylinder body 4*b* configured to move along the rod 4*a*. Both ends of the rod 4*a* are secured to the upper plate 5*a* and the lower plate 5*b*. The cylinder body 4*b* is connected to an air source (not illustrated) and is lowered from a predetermined upper position (see FIG. 1) to a predetermined lower position (see FIG. 2) through air supply from the air source. Also, the cylinder body 4*b* is lifted from the lower position to the upper position through discharge of the air.

Also, the drive unit 4 has an engagement unit (second engagement unit) 4*c* that is secured to the cylinder body 4*b* and can be engaged with the engagement unit 2*c*. The engagement unit 4*c* has a cantilever plate shape projecting in the horizontal direction from the cylinder body 4*b* toward the nozzle head 3. The engagement unit 4*c* and the engagement unit 2*c* are engaged in both upper and lower directions by the engagement unit 4*c* being fitted into the engagement unit 2*c* that is a recessed portion, and the cylinder body 4*b* is thus coupled to the one suction nozzle 2 at the use position so as to be able to integrally move in the upper direction and the lower direction.

Here, the engagement unit 2*c* is opened on both sides in the circumferential direction around the rotational axis line A, and the engagement unit 2*c* is thus engaged with the engagement unit 4*c* through rotational movement of the engagement unit 2c in the circumferential direction caused by the rotation of the revolver 8.

The magnet 2h of the suction nozzle 2 at the use position is separated from the magnetic member 10 in response to the lowering of the cylinder body 4b from the upper position to the lower position, and the suction nozzle 2 at the use position is then lowered from the standby position to the suction position. A hole 5d through which the suction nozzle 2 at the use position penetrates is formed in the lower plate 5b in order to allow the suction nozzle 2 at the use position to move between the standby position and the suction position. The suction nozzle 2 at the suction position is preferably supported at two locations, namely the inner surface of the lower end portion of the groove 8a and the inner surface of the hole 5d, such that the posture of the suction nozzle 2 at the suction position is stabilized.

Also, the suction nozzle 2 at the use position is lifted from the suction position to the standby position in response to the lifting of the cylinder body 4b from the lower position to the upper position.

The air connection unit 7 is secured to the upper surface of the lower plate 5b and is arranged between the suction nozzle 2 at the use position and the drive unit 4. A connection port 7a is opened in an upper surface of the air connection unit 7, and the connection port 7a is connected to the connection port 2g of the suction nozzle 2 arranged at the suction position. The air connection unit 7 is connected to a negative pressure source (not illustrated) such as a vacuum pump via a pipe 12, and a negative pressure generated by the negative pressure source is applied to the connection port 2g via the pipe 12, the air connection unit 7, and the connection port 7a and is further applied from the connection port 2g to the inlet port 2e.

Next, an operation of the apparatus for taking out a workpiece 1 will be described.

The apparatus for taking out a workpiece 1 is connected to the distal end of the robot arm at the ATC 6 and moves between a taking-out position and a transport position in response to operations of the robot arm. Multiple workpiece loaded in bulk in a box, for example, are arranged at the taking-out position.

First, the suction nozzle 2 that has the suction unit 2b in accordance with the type of the workpiece is selected, and the selected suction nozzle 2 is arranged at the use position through the rotation of the revolver 8. At this time, the engagement unit 2c of the selected suction nozzle 2 is engaged with the engagement unit 4c, and the selected suction nozzle 2 is coupled to the cylinder body 4b, through the rotational movement of the selected suction nozzle 2 to the use position.

Next, the apparatus for taking out a workpiece 1 is positioned at the taking-out position through an operation of the robot arm.

Next, the suction nozzle 2 at the use position is lowered from the standby position to the suction position in response to the lowering of the cylinder body 4b, the suction unit 2b is arranged in the vicinity of the workpiece, and the air connection unit 2d is connected to the connection unit 7.

Next, a negative pressure is applied to the air connection unit 7 from the negative pressure source via the pipe 12, and further, the negative pressure is applied from the air connection unit 7 to the inlet port 2e via the air connection unit 2d. In this manner, one workpiece in the vicinity of the inlet port 2e is suctioned to the suction unit 2b, and the one workpiece is held by the suction nozzle 2 at the suction position.

Next, the apparatus for taking out a workpiece 1 is caused to move from the taking-out position to the transport position through an operation of the robot arm. At the transport position, the application of the negative pressure to the air connection unit 7 is stopped, the suction of the one workpiece is released, and the released one workpiece is placed at the transport position.

Next, the apparatus for taking out a workpiece 1 is caused to move from the transport position to the taking-out position through an operation of the robot arm and is positioned at the taking-out position. Thereafter, the same operations are repeated.

When the type of the workpiece to be transported is changed, the suction nozzle 2 to be used to suction the workpiece is changed. Specifically, the suction nozzle 2 at the use position is lifted from the suction position to the standby position in response to lifting of the cylinder body 4b. The suction nozzle 2 at the use position is hung by the magnet 2h being suctioned to the magnetic member 10 and is held at the standby position. Next, a newly selected suction nozzle 2 is arranged at the use position through rotation of the revolver 8.

In this manner, according to the embodiment, the plurality of suction nozzles 2 that have mutually different suction units 2b are supported by the revolver 8, and the suction unit 2b to be used to suction a workpiece can be changed through rotation of the revolver 8. Thus, it is possible to hold and transport multiple types of workpieces using the one apparatus for taking out a workpiece 1, and there is no need to prepare an apparatus for taking out a workpiece that serves as a hand apparatus for each type of workpiece.

Also, it is possible to change the suction nozzle 2 to be used to suction the workpiece with a simple mechanism of merely causing the revolver 8 to rotate.

In addition, the configuration in which one of the plurality of suction nozzles 2 is selectively arranged at the use position and the drive unit 4 lifts and lowers the suction nozzle 2 at the use position is employed. Thus, only one drive unit 4 is needed regardless of the number of suction nozzles 2. In other words, since only one drive unit 4 is provided even if the number of suction nozzles 2 is increased to handle more types of workpieces, it is possible to suppress an increase in size and weight of the apparatus for taking out a workpiece 1. As a result, it is possible to realize the small-sized light-weight apparatus for taking out a workpiece 1 that can be transported by a small-sized light-weight industrial robot and to prevent an increase in interference between the apparatus for taking out a workpiece 1 and an object in the surroundings.

Although the magnets 2h are provided at the upper ends of the suction nozzles 2 in the aforementioned embodiment, the magnets 2h may be provided at other positions in the suction nozzles 2 instead. For example, the magnets 2h may be secured to the outer circumferential surfaces of the pipes 2a, and the magnetic member 10 may be secured to the inner surfaces of the grooves 8a.

Figure 5:
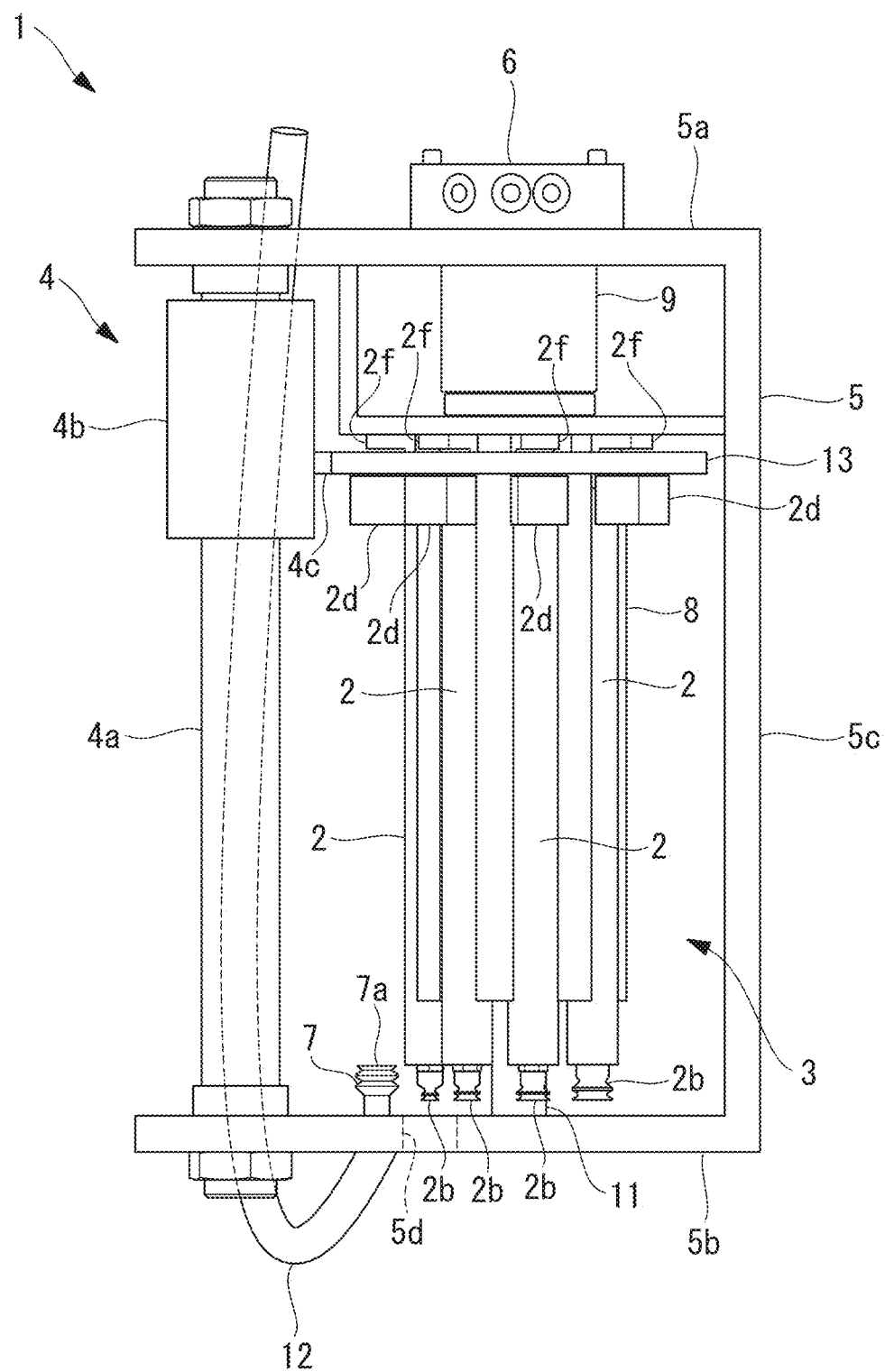
FIG. 5 is a side view illustrating an overall configuration of an apparatus for taking out a workpiece according to another embodiment.
Figure 6:
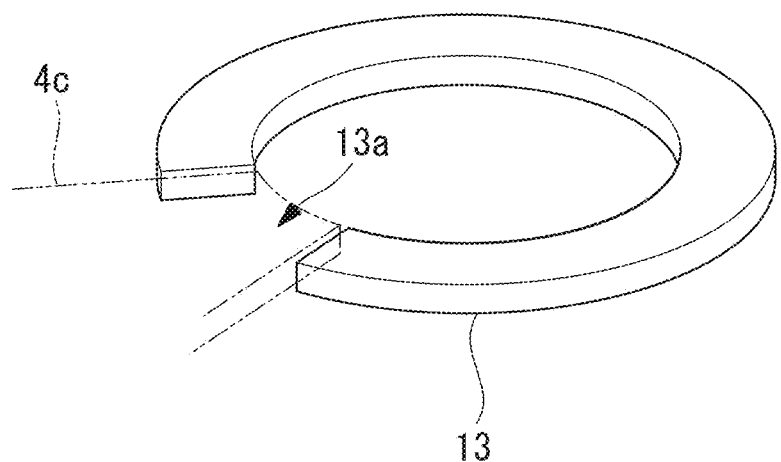
FIG. 6 is a perspective view of a hanging member for the apparatus for taking out a workpiece in FIG. 5.

Although the nozzle head 3 has the magnetic member 10 to hold the plurality of suction nozzles 2 at the standby position against their own weights in the aforementioned embodiment, the nozzle head 3 may have a hanging member 13 with a substantially C shape secured to the frame 5 as illustrated in FIGS. 5 and 6 instead. The hanging member 13 is, for example, a member with a flat plate shape.

The hanging member 13 has a partial annular shape arranged coaxially with the rotational axis line A in the surroundings of the revolver 8 and extending over the entire circumference except for a portion corresponding to the use position. Each of the suction nozzles 2 is provided with a hook unit that projects further outward in the horizontal direction than the pipe 2a and the revolver 8 and is hooked on the upper surface of the hanging member 13. For example, the hook unit is a member 2f with a cantilever plate shape arranged above the engagement unit 2c. The hanging member 13 is arranged in the vicinity of the upper end of the revolver 8, and the hook units 2f of the suction nozzles 2 at the standby position other than the one suction nozzle 2 at the use position are hooked on the upper surface of the hanging member 13. In this manner, the other suction nozzles 2 are hung and held at the standby position.

When the cylinder body 4b is arranged at the upper position, the engagement unit 4c is arranged in an opening portion 13a at a portion of the hanging member 13 corresponding to the use position. The suction nozzle 2 at the use position is hung by the hook unit 2f being hooked on the upper surface of the engagement unit 4c.

During the rotation of the revolver 8, the hooking of the hook unit 2f on the hanging member 13 is maintained at a position other than the use position. The hooking of the hook unit 2f on the hanging member 13 is released at the use position, and the hook unit 2f is hooked on the engagement unit 4c instead.

Although one of the plurality of suction nozzles 2 is selectively arranged at the use position through the rotation of the support unit 8 in the aforementioned embodiment, a configuration in which one of the suction nozzles 2 is selectively arranged at the use position through movement of the support unit other than rotation instead may be employed.

For example, the support unit may support the plurality of suction nozzles 2 in a line in the horizontal direction, and one of the plurality of suction nozzles 2 may be selectively arranged at the use position through linear motion of the support unit in the horizontal direction.

Although the drive unit 4 has the air cylinder that serves as the linear motion mechanism in the aforementioned embodiment, the drive unit 4 may have another type of linear motion mechanism such as an electric cylinder instead.

Although the suction nozzles 2 suction the workpiece using the negative pressure in the aforementioned embodiment, the workpiece may be suctioned using a magnetic force instead. In such a case, magnets may be provided on the lower surfaces of the suction units 2b.

REFERENCE SIGNS LIST

1 Apparatus for taking out workpiece
2 Suction nozzle
2a Pipe
2b Suction unit
2c First engagement unit
2e Inlet port
2f Hook unit
2g Connection port
2h Magnet
3 Nozzle head
4 Drive unit
4a Rod, air cylinder, linear motion mechanism
4b Cylinder body, air cylinder, linear motion mechanism
4c Second engagement unit
5 Frame
7 Air connection unit
8 Revolver (support unit)
8a Groove
10 Magnetic member
13 Hanging member
A Rotational axis line

The invention claimed is:

1. An apparatus for taking out a workpiece, the apparatus comprising:
a nozzle head that has a plurality of suction nozzles, each suction nozzle of the plurality of suction nozzles comprises a suction unit configured to suction a workpiece, a frame, and a support unit that supports the plurality of suction nozzles and is supported by the frame in a movable manner, wherein the support unit is caused to move relative to the frame, thereby selectively arranging one of the plurality of suction nozzles at a predetermined use position;
a drive unit that causes one suction nozzle arranged at the predetermined use position to move relative to the frame and causes the one suction nozzle to move to a predetermined suction position at which the workpiece is suctioned by the suction unit;
wherein the support unit is a revolver that is able to rotate about a rotational axis line in a vertical direction relative to the frame;
wherein the revolver supports the plurality of suction nozzles in a movable manner in the vertical direction, and the suction unit is provided on a lower end of each of the suction nozzles;
wherein the drive unit causes the one suction nozzle to move in the vertical direction between a predetermined standby position and the predetermined suction position located further downward than the predetermined standby position in the vertical direction;
wherein each of the plurality of suction nozzles is provided with a hook unit projecting in a radial direction that perpendicularly intersects the rotational axis line;
wherein the nozzle head has a hanging member with a partial annular shape arranged coaxially with the rotational axis line and extending over an entire circumference except for a portion corresponding to the predetermined use position; and
wherein the hanging member is arranged at a position at which the hook units of the suction nozzles at the predetermined standby position other than the one suction nozzle are hooked on an upper surface of the hanging member.

2. The apparatus for taking out a workpiece according to claim 1, wherein:
each of the suction nozzles is provided with a first engagement unit comprising a recessed portion and projecting outward in a radial direction that perpendicularly intersects the rotational axis line;
the drive unit has a second engagement unit comprising a cantilever plate shape that is engaged with the first engagement unit of the one suction nozzle at the predetermined use position in both upper and lower directions and a linear motion mechanism that causes the second engagement unit to move in the vertical direction; and
the first engagement unit is engaged with the second engagement unit through movement of the first engagement unit in a circumferential direction around the rotational axis line caused by rotation of the revolver.

3. The apparatus for taking out a workpiece according to claim 2, wherein the linear motion mechanism comprises an air cylinder.

4. The apparatus for taking out a workpiece according to claim 2, wherein the linear motion mechanism comprises an electric cylinder.

5. The apparatus for taking out a workpiece according to claim 1, wherein:
- each of the suction nozzles has an inlet port provided at the suction unit and a connection port that communicate with the inlet port; and
- the apparatus includes an air connection unit that is connected to the connection port of the one suction nozzle arranged at the predetermined suction position, and a negative pressure is applied to the connection port via the air connection unit.

\* \* \* \* \*